May 6, 1958     W. R. JUSTUS     2,833,319
GREASE DRAIN RACK
Filed June 13, 1956
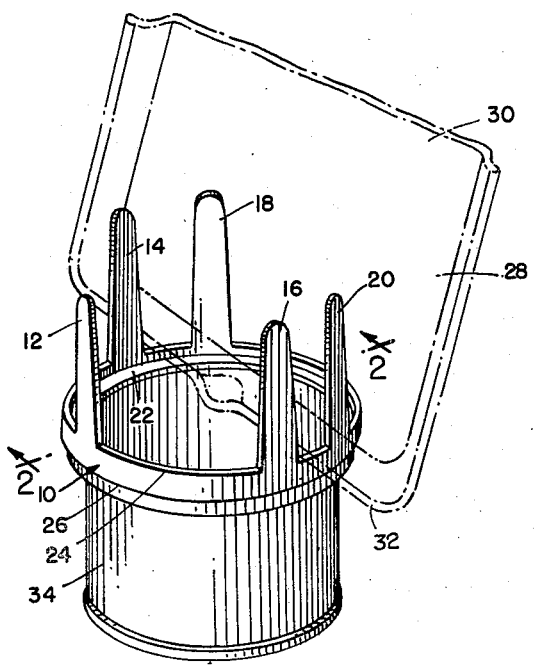
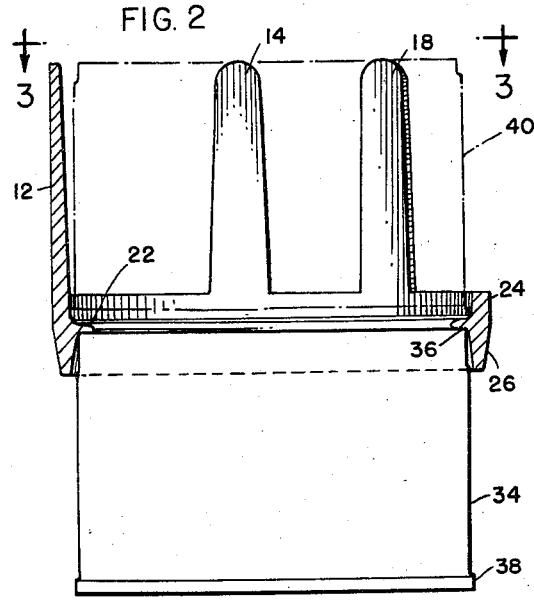
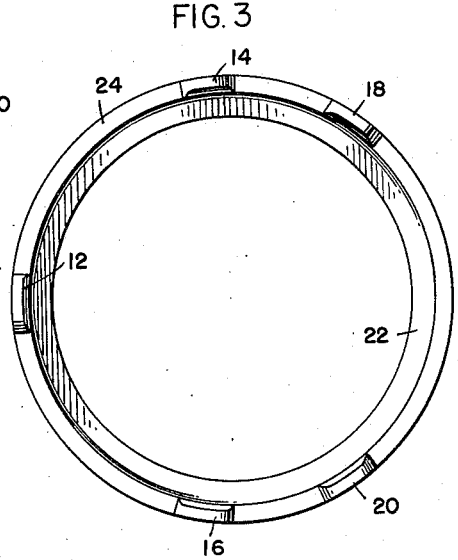
INVENTOR:
WILLIAM R. JUSTUS
ATT'YS

United States Patent Office 2,833,319
Patented May 6, 1958

2,833,319
GREASE DRAIN RACK
William R. Justus, Chicago, Ill.

Application June 13, 1956, Serial No. 591,235

3 Claims. (Cl. 141—364)

This invention relates to a drain rack and more particularly a drain rack for supporting a broiling pan, skillet, or other utensil, in balanced position on a suitable receptacle for grease storage such, for example, as a coffee can of a standard size.

One of the problems in preparing fried foods is that the fat must be drained manually into a storage jar or can. In ordinary domestic use an emptied coffee can is generally used for this purpose. The utensil will generally be extremely hot and hard to handle and, therefore, somewhat dangerous if tipped. Also, the grease is apt to spatter and run down around the edges of the receptacle.

It is accordingly an object of the present invention to provide a convenient grease drain rack suitable for mounting on the open top of a coffee can of standard size and which is adapted to support a frying pan or similar utensil with its center of gravity within the boundaries of the coffee can so that the assembly will be stable and not likely to tip.

Further objects of the invention are to provide a drain rack which will serve to prevent grease from spilling on the side of the can and which will confine the flow of draining and dripping grease within the can; to provide a drain rack suitable for positioning pans of various sizes in balanced position as described; and to provide a plurality of angularly spaced upstanding fingers on the drain rack whereby a pan from which fat or grease is being drained may be restrained from sliding forwardly off the rack and the bottom of the pan may be supported at a relatively steep angle for the aforementioned balanced disposition of the pan.

Other objects are to provide a drain rack, as described, having a depending annular flange of substantially the same diameter as the diameter of a standard coffee can, and a radial inwardly projecting support shelf extending around the inside of the rack above the depending flange so that the rack will be securely supported on top of the can when desired; and to provide an annular flange formed integrally with the depending flange and horizontal shelf described, and which has a diameter substantially larger than the diameter of the first-mentioned annular flange and substantially the same as the diameter of the annular bead at the bottom of a standard coffee can whereby the can may be disposed in a stored position within the upstanding fingers of the rack after it has been used for receiving grease, whereby the can and the rack will provide a very compact unit for storage.

A still further object is to provide a drain rack as described, wherein the annular support shelf is adapted to overhang the edge of the receptacle and serve as a guide for preventing flow of grease downwardly around the sides of the receptacle as the grease is poured from the utensil supported on the rack.

Other objects and advantages of the invention will become apparent as the description proceeds in accordance with the accompanying drawings showing a specific embodiment of the invention and in which:

Figure 1 is a perspective view of the drain rack according to the invention disposed in operative or working position on the open top of a can or receptacle and with a pan, shown in dot-dash outline, in draining position thereon.

Fig. 2 is a vertical sectional view taken through the lines 2—2 of Fig. 1; and

Fig. 3 is a top plan view taken along the lines 3—3 of Fig. 2.

Referring now to Fig. 1, the drain rack of the invention comprises a body ring 10 having a plurality of upstanding and preferably vertically disposed fingers 12, 14, 16, 18 and 20, a radially inwardly extending support shelf 22, and a pair of opposite axially projecting annular collars 24 and 26 defined by the body 10 and the shelf 22.

It is preferred to provide a predetermined angular disposition of the fingers 12 through 20 on the edge of the upwardly projecting collar 24, such that fingers 14 and 16 are on substantially diametrically opposite sides of the collar 24 and the fingers 18 and 20 are equally spaced from the fingers 14 and 16, on the same side of a vertical plane therethrough, a distance of about 30 to 40 degrees so as to define a space extending between the fingers 14—18 and 16—20 that is substantially parallel to the said plane of the fingers 14 and 16.

At the same time the finger 12 is preferably disposed substantially midway, angularly, between the fingers 14 and 16 and on the opposite side from the fingers 18 and 20, so that a diameter of the ring 10 intersecting the finger 12 will be normal to the vertical plane common to the fingers 14 and 16 midway between the fingers 18 and 20.

The fingers are preferably of a height at least as great as the radius of the ring 10 and preferably about two-thirds the ring diameter, and as seen in Fig. 1 a pan 28, which is relatively shallow may be disposed in the spaces between the fingers 14—18 and 16—20 with its bottom 30, supported by the tips of one pair of the fingers, at a high angle of inclination and with its rim 32 retained by the bases of the other pair of fingers against forward movement. Thus, depending upon the size and shape of the pan, the bottom of the pan may be supported by whatever fingers will hold the pan at the necessary inclination for location of the center of gravity of the pan as will avoid any possibility of the assembly tipping over. Also if desired, a square pan may be positioned cornerwise in the drain rack, as when no drip spout is provided.

As shown in Fig. 3 the smallest spaces are those between the fingers 14—18 and 16—20; and the sides of the fingers 14 and 16 nearest the fingers 18 and 20 are on a common diameter of the body ring 10. Thus the center of gravity of a pan disposed in these spaces will ordinarily be within the area defined by the ring 10 and when the pan 28 has been placed in draining position as shown, it will be firmly supported and no further attention is required until draining of the grease from the pan has been completed.

However, if it should be desired to drain a relatively deep pan, the pan may be set on the other side of the fingers 14 and 16, for example, so that its bottom rests on the finger 12. In fact, a number of pan-draining positions may be visualized to accommodate a wide range of pan sizes and depths. For example, a pan may be disposed between the fingers 12—16 and 18—20 with its bottom resting on the finger 20; or between the fingers 12—14 and 18—20.

Referring now more particularly to Fig. 2, it will be seen that the body ring 10 is adapted to fit rather snugly upon a receptacle 34 which is preferably a coffee can of standard size and shape. Therefore, the depending collar 26 is given an internal diameter substantially equal to that of the outside diameter of the opened top of the can 34 at its upper rim 36. However, the annular upstanding collar 24 is provided with an internal diameter slightly greater than that of the collar 26 so as to be substantially the same as the outside diameter of the bead 38 at the bottom of the can. The purpose of this arrangement is to permit the can to be placed inside of the drain rack between the upstanding fingers for storage purpose as indicated by the dot-dash outline 40 in Fig. 2.

In use, therefore, when the drain rack is placed on the open top of the can 34, as shown, the upstanding collar or flange 24, together with the shelf 22, will serve to prevent grease from leaking over and down the sides of the can and will direct it inwardly to drip into the can or receptacle body. The shelf 22 also serves to support the drain rack firmly on the upper edge 36 of the can.

After the grease or other fatty materials have been drained from the pan, such as the pan 28, the rack may be readily lifted from the can 34 and placed on a working surface, whereupon the can may be inserted downwardly between the upstanding fingers 12 through 20 and will rest on the shelf 22 with its bottom edge spaced from the working surface by the lower collar 26 so that no burning of the work surface due to hot grease in the can will occur.

Thus a compact unit is formed wherein both the receptacle and the rack are retained together for ready storage and use and also the can is held firmly against accidental tipping. The grease drain rack 10 will also serve to identify the can as one within which greases are stored, as for example when the assembly is stored in a refrigerator, thereby eliminating the usual search for the can in which this material is contained. Also when stored in the rack 10, the can may readily be covered by any suitable means without interference from the surrounding fingers.

The annular ring 10 and the fingers 12 through 20 may be formed as a single unitary structure and of any suitable material, whether plastic, metal or other preferably heat-resistant substance. Its attractive appearance and suitability for use with a variety of utensils further aids in the solution of the perennial problem of the handling of hot or sputtering greases after the cooking of fried foods or the like. Accordingly, there has been provided a device for disposing of greases and for holding pans during draining which is simple and easy to use as well as economical to manufacture; and which, by its use, is a great convenience in that it obviates the need for manually holding the pan to be drained during the draining operation.

Although the invention has been shown and described with respect to a single specific embodiment, and certain details and principles thereof, it will be understood that details of the construction shown may be altered or omitted without departing from the spirit of the invention as defined by the following claims.

I claim:

1. In a grease drain rack for supporting pans and the like on the open end of a cylindrical receptacle for grease, said rack comprising a cylindrical ring having a radially inwardly extending support shelf intermediate the ends of the ring, a pair of substantially diametrically opposed vertical support fingers integral on the upper end of said ring, and a second pair of vertical support fingers on the upper end of said ring each spaced angularly a predetermined distance from a respective one of said first pair of support fingers, said second pair of support fingers extending a distance above the plane of said ring sufficient to support a pan thereon with the rim of the pan restrained against horizontal movement by said first pair of fingers and the bottom of the pan supported by at least one of said second pair of fingers.

2. A grease drain rack for supporting pans and the like on the open end of a cylindrical receptacle comprising a cylindrical ring having a radially inwardly extending support shelf intermediate the ends of said ring, a pair of substantially diametrically opposed upstanding support fingers on the upper end of said ring, a support finger disposed on the upper end of the ring substantially midway angularly between said first pair of support fingers, and a second pair of support fingers spaced apart angularly on the upper end of the ring on the side of said first pair of support fingers opposite the second named support finger, said support fingers being integral on said ring and extending a distance above the plane of said ring sufficient to support a pan edgewise thereon with the rim of the pan restrained by a pair of said fingers and the bottom of the pan supported by at least one of the other support fingers and with the center of gravity of the pan within a vertical projection of the area within said ring.

3. In combination with a cylindrical open-ended can having a peripheral bead on its bottom end, a cylindrical drain ring comprising an inwardly radially extending support flange intermediate the top and bottom ends of the ring, a vertical annular collar portion below said flange having an inside diameter substantially equal to the outside diameter of the open end of the can for removably receiving the open end of the can, an annular collar portion above said flange having an inside outside diameter greater than the diameter of the bead on the bottom of said can, and a plurality of axially parallel pan support fingers disposed in a predetermined angularly spaced relationship around the top end edge of the last-named collar portion in upstanding relationship to the plane of said ring, whereby a pan to be drained may be placed edgewise on said ring with its rim restrained from movement across said ring by at least one of said fingers and its bottom wall supported by at least one other of said fingers, the last named collar portion of said ring being adapted to receive the bottom end of said can for storage of the can within the ring.

References Cited in the file of this patent

UNITED STATES PATENTS

| | | |
|---|---|---|
| 496,537 | Purrington | May 2, 1893 |
| 1,994,158 | Wiswell | Mar. 12, 1935 |
| 2,075,721 | Hommel | Mar. 30, 1937 |
| 2,608,843 | Kennedy | Sept. 2, 1952 |